(12) United States Patent
Vitale

(10) Patent No.: US 6,902,071 B2
(45) Date of Patent: Jun. 7, 2005

(54) DVD-VCR-CD SHELF STORAGE SYSTEM

(76) Inventor: Steven J. Vitale, 81 Cardinal Dr., Jackson, NJ (US) 08527

( * ) Notice: Subject to any disclaimer, the term of this patent is extended or adjusted under 35 U.S.C. 154(b) by 0 days.

(21) Appl. No.: 10/327,920

(22) Filed: Dec. 26, 2002

(65) Prior Publication Data

US 2004/0124160 A1 Jul. 1, 2004

(51) Int. Cl.⁷ .................................................. A47F 7/00
(52) U.S. Cl. ........................ 211/40; 211/87.01; 211/42; 211/35; D6/407
(58) Field of Search ................................ 211/85.7, 189, 211/182, 40, 34, 35, 37, 42, 41.12, 87.01, 90.01, 90.02, 90.04; 108/181; D6/462, 458, 407

(56) References Cited

U.S. PATENT DOCUMENTS

| | | | |
|---|---|---|---|
| 1,206,770 A | * 11/1916 | Adams | |
| 2,110,158 A | * 3/1938 | Keeler | 211/182 |
| D331,601 S | * 12/1992 | Harrison | |
| D337,007 S | * 7/1993 | Hanson | D6/462 |
| D357,827 S | * 5/1995 | Schultz | D6/462 |
| D363,587 S | * 10/1995 | Glinski | D6/462 X |
| D365,227 S | * 12/1995 | Chambers et al. | D6/407 X |
| 5,520,293 A | * 5/1996 | Hartley | 211/182 |
| 5,590,794 A | * 1/1997 | Zachary | 211/10 |

* cited by examiner

Primary Examiner—Robert W. Gibson, Jr.
(74) Attorney, Agent, or Firm—Charles I. Brodsky

(57) ABSTRACT

A system including pluralities of tubular lengths and T-connectors couplable with said lengths in a package for assemblage into an orthogonal frame of width, length and depth not in excess of 24 inches, 80 inches and 5½ inch, respectively, for securement to one of a planar wall and planar door surface.

14 Claims, 3 Drawing Sheets

DVD-VCR-CD SHELF STORAGE SYSTEM

CROSS-REFERENCE TO RELATED APPLICATIONS

NONE

STATEMENT REGARDING FEDERALLY SPONSORED RESEARCH OR DEVELOPMENT

Research and development of this invention and Application have not been federally sponsored, and no rights are given under any Federal program.

REFERENCE TO A MICROFICHE APPENDIX

NOT APPLICABLE

BACKGROUND OF THE INVENTION

1. Field of the Invention

This invention relates to digital video disc (DVD), video cassette recorder (VCR) and compact disc (CD) shelf storage systems, in general, and to such a storage system as may be utilized for home theater design, in particular.

2. Description of the Related Art

As will be appreciated, purchasers of compact discs (CD's) also are frequent buyers of video cassettes, and additionally, purchasers of digital video discs (DVD's). As will be appreciated, various boxes, cabinets and the like are available to house and keep these forms of entertainment neatly organized, although only in separate integral units at the present time. Many of those that are available have been noted to be bulky and heavy however—and once reaching a certain height in so called "tower constructions", become subject to an accidental toppling over, with the attendant injury and/or damage that might result. As will be appreciated, this presents an even greater problem in home theater designed systems where it is not uncommon to find a devotee having hundreds of CD's, VCR cassettes, and DVD's—which for the sake of convenience and appearance should preferably be located near one another. As will be readily understood, there is currently no such system available to meet these objectives.

SUMMARY OF THE INVENTION

As will become clear from the following description, the DVD-VCR-CD shelf storage system of the present invention includes pluralities of tubular lengths and pluralities of T-connectors couplable with the lengths in a package for assemblage into an orthogonal frame of width, length and depth not in excess of 24 inches, 80 inches and 5½ inches respectively—and preferably a frame of substantially those dimensions. As will be appreciated, such selection allows the frame to stand on the floor in a room, and to be fastened to the typical inside doors of an apartment or house—as, for example, behind a closet door so as to be hidden from view. In such a package, appropriate fasteners may be included for accommodating this—e.g. molly screws where securement to a lanai door is envisioned, or other screws where securement is to be to a wall stud. With the T-connectors employed, a depth of 5½ inches assures that the typical CD and DVD sized jewel cases do not fall through the shelf when placed therein. When selecting these tubular lengths and T-connectors of a plastic composition (preferably of polyvinylchloride composition of a 1-inch circular cross-section), these lengths enable the construction described below to adequately and safely store approximately 304 DVD's, 160 video cassettes, or 440 CD's, or combinations of them, in an orthogonal frame 24 inches wide, 80 inches high, and 5½ inches deep.

BRIEF DESCRIPTION OF THE DRAWINGS

These and other features of the present invention will be more clearly understood from a consideration of the following description, taken in connection with the accompanying Drawings, in which.

DETAILED DESCRIPTION OF THE INVENTION

Figure 1:
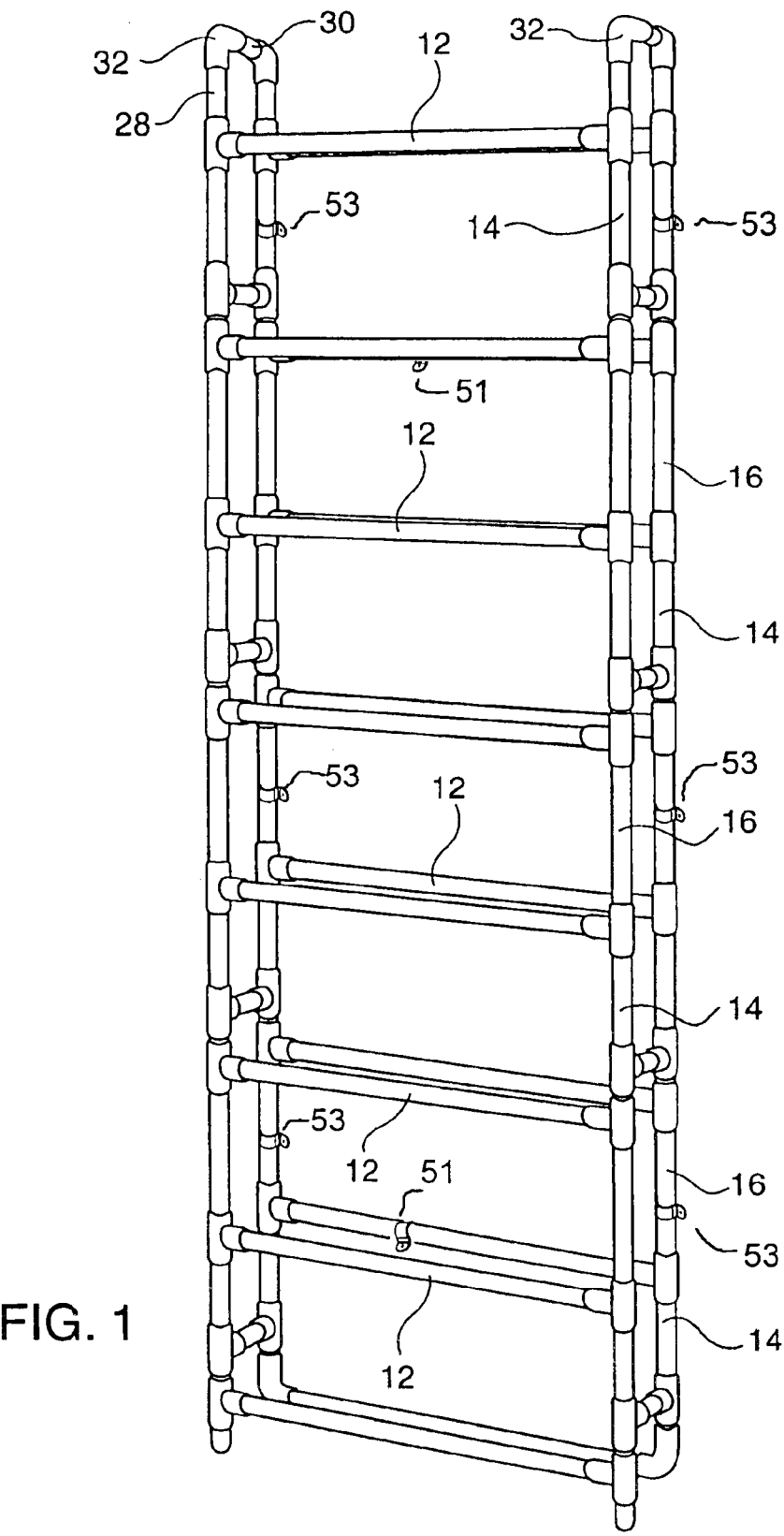
FIG. 1 is a pictorial illustration of the shelf storage system of the invention as it might sit on a floor in a room.

In the Drawings, the orthogonal frame forming the DVD-VCR-CD shelf storage system of the invention is shown at 10, as including a first plurality of tubular lengths 12 aligned horizontally. A second plurality of tubular lengths 14 and a third plurality of tubular lengths 16 are aligned vertically, coupled together by a first plurality of T-connectors 18. To fit on a closet door, for example, the tubular lengths 12 are selected substantially 22 inches long, in fitting within T-connectors of 2 inch bar length and 1 inch mid leg. An overall 24 inch width thus results for the frame 10.

In the construction shown in FIG. 1, sixteen of these 22 inch lengths are employed (eight in front and eight in back). The second and third pluralities of tubular lengths may each be of similar length—but recognizing that the height dimension of video cassettes are greater than the height dimension of CD and DVD jewel cases, the second and third pluralities of tubular lengths in a preferred embodiment of the invention are dissimilar; a 9 inch length for the third pluralities forming the third, fifth and seventh shelf of the frame in FIG. 1 and of a smaller 6½ inch length for the second pluralities forming the second, fourth and sixth shelf of the frame. Coupled between the T-connectors 18, twelve of the 9 inch lengths 16 are illustrated front and back and sixteen of the 6½ inch lengths 14. Twelve T-connectors 18 are shown as well.

Figure 2:
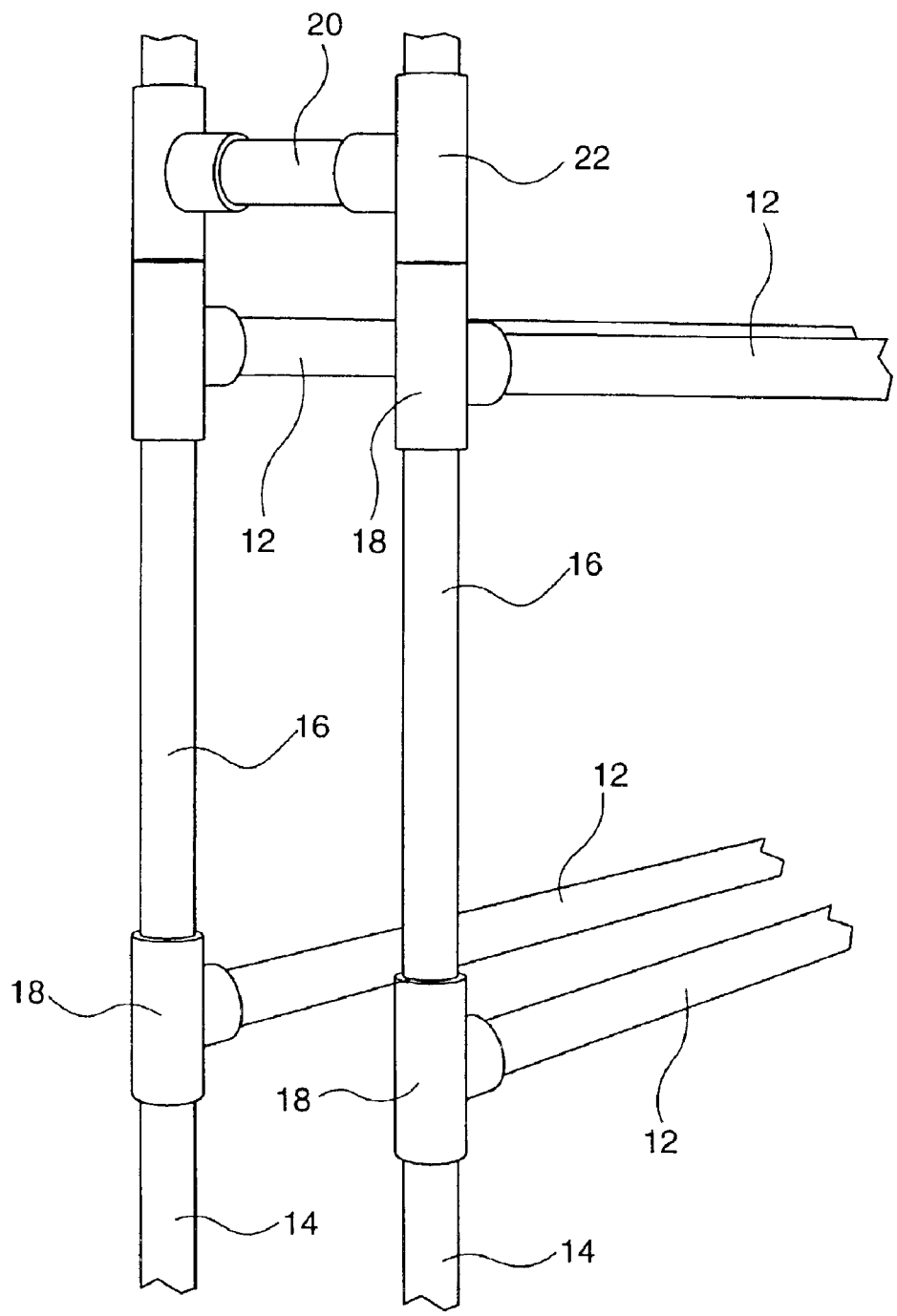
FIG. 2 is an illustration helpful in an understanding of the manner of assembling the tubular lengths and T-connectors in forming the orthogonal frame construction of the FIG. 1 storage system.
Figure 4:
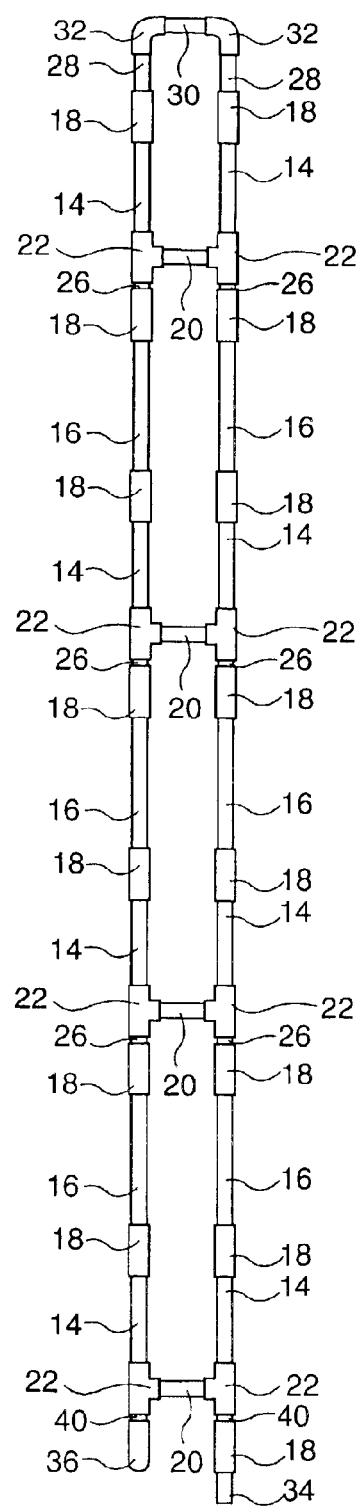

To add side support to the frame 10 as it is being loaded with DVD's, video cassettes, and CD's, a fourth plurality of tubular lengths aligned horizontally are further included, shown by the reference numeral 20 (FIGS. 2 and 4). These lengths 20 likewise couple at one end to the lengths 14 through their own T-connector 22. In providing the depth to the orthogonal frame 10, these fourth tubular lengths 20 are selected of a length of 3½ inches in preventing any jewel cases from falling from one shelf to another. As will be appreciated, with the eight shelf construction shown in FIG. 1 with twelve of the 9 inch tubular lengths 16 and with sixteen of the 6½ inch tubular lengths 14, eight of the 3½ inch tubular lengths 20 are employed for the shelf system—four on the left side and four on the right side. Six T-connectors 22 are used, three on each side.

Figure 3:
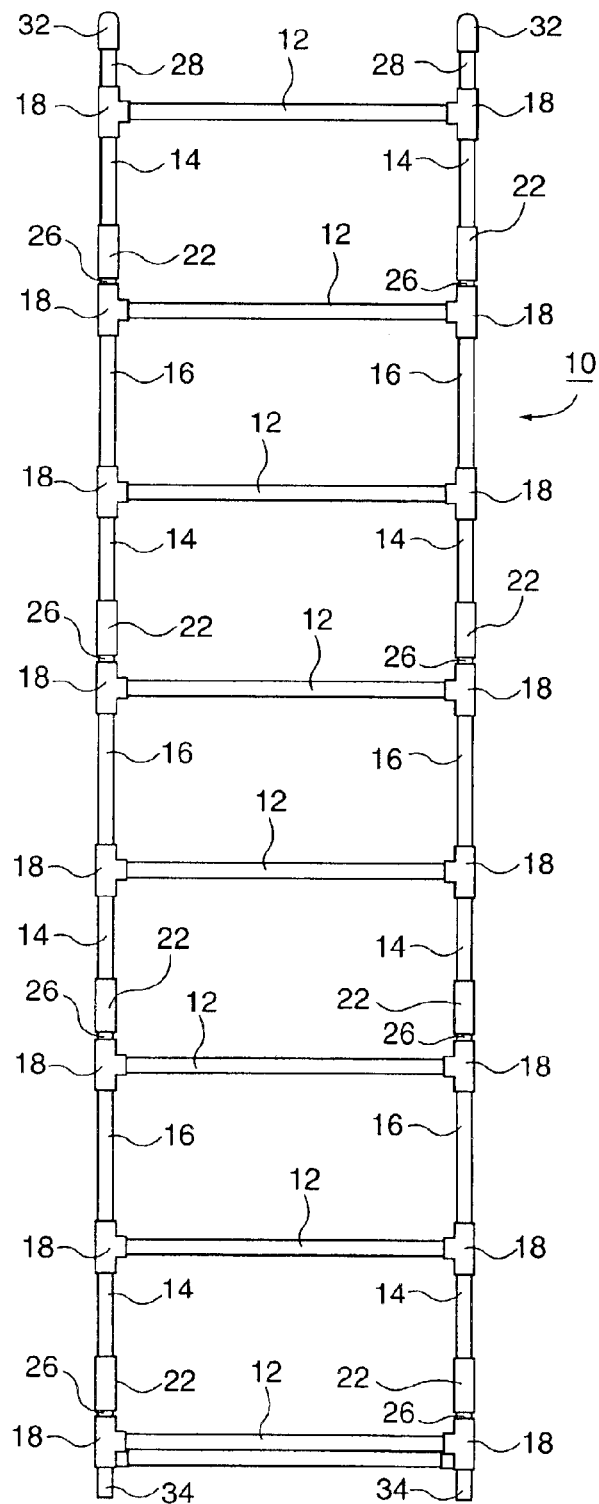
FIGS. 3 and 4 illustrate front and left side views of the storage system of FIG. 1 helpful in an understanding of the dimensionalization of its component parts in utilizing tubular lengths of one inch diameter with T-connectors couplable together with them.

As indicated in FIG. 3, an additional plurality of tubular lengths 2""6 are included, in coupling the adjacent T-connectors 18, 22 together. Such tubular lengths may be 1½ inch in length, and in the eight shelf configuration of FIG. 1, twelve such lengths 26 are employed (three on each side, front and back).

In completing the construction, six additional tubular lengths are employed aligned vertically. Four of them are shown at 28 in forming the top shelf, joined together by a pair of like horizontally aligned tubular lengths 30 of 3½ inch length, with four 90° elbows 32 coupling them together. The remaining two tubular lengths 34 couple with lower connection 18 to form front legs for the frame 10, both selected of a length so that when the frame 10 is completed standing on the floor, the back of the bottom shelf sits atop whatever floor molding might be employed. The lengths for the front legs 34 may be the same as that for the top lengths 28, of some 4½ inches. Two additional 90° elbows 36 couple the tubular length 12 of the bottom shelf to the 1½ inch length 40 coupled with a further bottom T-connector 18 for rear legs. With the construction of the invention, by filling all shelves with just video cassettes, 160 can be stored; by filling them instead just with DVD's, 304 can be stored; by filling them just with CD's, 440 could be stored (or lesser combinations of any one as they are mixed together.

In the preferred construction, both the tubular lengths and all connectors employed were selected of a plastic composition (as were the elbows utilized), and preferably of a polyvinylchloride plastic composition, and with the tubular lengths all being of circular cross-section. By having the front legs 34 of a length at least as great as the typical floor molding, the orthogonal frame 10 could be positioned flat against a planar wall surface in presenting a pleasing, organized appearance. As will be appreciated by those skilled in the art, selecting the tubular lengths 12 of dimension greater than 24 inches could lead to its bowing under the weight of the entertainment packages supported, an undesirable attribute both in the context of appearance and in support. Making it wider also limits its mounting to an inside door, where the orthogonal frame 10 might be mounted instead—especially, in a location where space is limited, as might be the situation in apartment living.

To further secure the shelf storage system, appropriate fasteners may be provided—all in a unitary package in which the shelf storing system could be made available for purchase as a disassembled unit to be thereafter constructed together with a plan of instruction provided therewith. Such fasteners might include a rounded portion for engaging the cross-section of a horizontal shelf length as at 51, or a vertical portion of its side support as at 53, with a second right angled portion adapted for screw coupling to a planar wall surface or to a planar door surface (FIG. 1). When employed in these manners, the securement might be by sheetrock or like screws connected to an internal stud, or by a series of mollies for joining with a hollow core, lanai-type door. In any event, an orthogonal frame results for storing on its various shelves those DVD'S, video cassettes, and CD'S owned by the collector—and/or aligned side by side with a similar unit for a collection of several hundreds and/or thousands of these types of entertainments. With the dimensions set out, the 8-shelf frame of the present invention encompasses a height of 80 inches, a width of 24 inches and a depth of 5½ inches—with the 3½ inch lengths preventing fall-through of the DVD and CD jewel cases stored.

While there have been described what are considered to be preferred embodiments of the present invention, it will be readily appreciated by those skilled in the art that modifications can be made without departing from the teachings herein. For example, rear legs might be added similar to the front legs 34 if a wall molding were not present, while these lengths may be modified for different size wall moldings to begin with. Also, whereas these modifications might typically be in conjunction with the number of shelves selected and/or the dimensions for the various tubular lengths, the end result will continue to be one in which everything is coupled together in providing a frame organized to rest against a wall or to secure to a wall or to an inside door in supporting DVD's, video cassettes, and CD'S. For at least such reason, therefore, resort should be had to the claims appended hereto for a true understanding of the scope of the invention.

I claim:

1. A DVD-VCR-CD shelf storage system comprising:
   a first plurality of pairs of tubular lengths aligned horizontally;
   a second plurality of pairs of tubular lengths aligned vertically;
   a first plurality of T-connectors coupling together individual ones of said first and second pluralities of pairs of tubular lengths;
   a third plurality of pairs of tubular lengths aligned horizontally;
   a second plurality of T-connectors coupling together individual ones of said second and third pluralities of pairs of tubular lengths;
   with the length of each pair of tubular lengths of said third plurality being less than each of the widths of a compact disc and digital video disc jewel case, and less than the width of a video cassette stood vertically across individual ones of said first plurality of pairs of tubular lengths from front to back; and
   means engaging individual ones of said first and second pluralities of pairs of tubular lengths for one of fastening selected ones of said first and second pluralities of pairs of tubular lengths to a planar door surface and for standing other selected ones of said first and second pluralities of pairs of tubular lengths on a floor against a planar wall surface.

2. The shelf storage system of claim 1 wherein said first plurality of pairs of tubular lengths are each of a length less than 24 inches.

3. The shelf storage system of claim 2 wherein said first plurality of pairs of tubular lengths are each of a length of substantially 22 inches.

4. The shelf storage system of claim 1 wherein said third plurality of pairs of tubular lengths are each of a length of substantially 3½ inches.

5. The shelf storage system of claim 1 wherein said second plurality of pairs of tubular lengths include fourth and fifth pluralities of pairs of tubular lengths of similar length.

6. The shelf storage system of claim 1 wherein said second plurality of pairs of tubular lengths include fourth and fifth pluralities of pairs of tubular lengths of dissimilar length.

7. The shelf storage system of claim 6 wherein said fourth and fifth pluralities of pairs of tubular lengths are each of a length substantially 6½ inches, and 9 inches, respectively.

8. The shelf storage system of claim 1 wherein said pluralities of pairs of tubular lengths and said pluralities of T-connectors are each of a plastic composition.

9. The shelf storage system of claim 1 wherein said pluralities of pairs of tubular lengths and said pluralities of T-connectors are each of a polyvinylchloride plastic composition.

10. The shelf storage system of claim 1 wherein said first, second and third pluralities of pairs of tubular lengths are of circular cross-section.

11. The shelf storage system of claim 1 wherein each tubular length of said first, second and third plurality of pairs of tubular length are coplanar with each other.

12. The shelf storage system of claim 5 wherein each tubular length of said first, second, third, fourth and fifth plurality of pairs of tubular length are coplanar with each other.

13. The shelf storage system of claim 1 wherein said means for standing other selected ones of said first and second plurality of pairs of tubular lengths on a floor includes an additional pair of T-connectors respectively coupling together one of a vertically aligned tubular length and one of a horizontally aligned tubular length of one of said first plurality of pairs of tubular lengths, and a further pair of tubular lengths respectively coupling said additional pair of T-connectors to rest on said floor.

14. The shelf storage system of claim 13, also including a pair of elbow connectors coupling together one of a vertically aligned tubular length with the other horizontally aligned tubular length of said one of said first plurality of pairs of tubular lengths.

* * * * *